(12) United States Patent
Fukuda

(10) Patent No.: US 9,474,974 B2
(45) Date of Patent: Oct. 25, 2016

(54) METHOD FOR CONTROLLING COMPUTER, RECORDING MEDIUM AND COMPUTER

(71) Applicant: GREE, Inc., Minato-ku, Tokyo (JP)

(72) Inventor: Takayuki Fukuda, Minato-ku (JP)

(73) Assignee: GREE, INC., Minato-ku (JP)

( * ) Notice: Subject to any disclaimer, the term of this patent is extended or adjusted under 35 U.S.C. 154(b) by 8 days.

(21) Appl. No.: 14/573,735

(22) Filed: Dec. 17, 2014

(65) Prior Publication Data

US 2015/0174490 A1 Jun. 25, 2015

(30) Foreign Application Priority Data

Dec. 20, 2013 (JP) .................................. 2013-264634
Jun. 16, 2014 (JP) .................................. 2014-123677

(51) Int. Cl.
*A63F 13/5378* (2014.01)
*A63F 13/52* (2014.01)

(52) U.S. Cl.
CPC ........... *A63F 13/5378* (2014.09); *A63F 13/52* (2014.09)

(58) Field of Classification Search
CPC .... A63F 13/847; A63F 13/822; A63F 13/86; A63F 13/87; A63F 13/352; A63F 2300/5533
See application file for complete search history.

(56) References Cited

U.S. PATENT DOCUMENTS

2015/0050997 A1* 2/2015 Suzman et al. ................. 463/31

FOREIGN PATENT DOCUMENTS

JP 2010-125222 6/2010
JP 2013-118887 6/2013

OTHER PUBLICATIONS

GamesViperPlays, "Sim City 5 Multiplayer 1/4" published on Mar. 1, 2013, available at https://www.youtube.com/watch?v=bqW3XrG8wi0, last accessed Jul. 1, 2015.*
Taku Kihara; PSP Game Review—Ace Combat series latest work! Employing multiplayer operation of cooperative campaign!; "Ace Combat X2 Joint Assault"; [online]; Impress Inc.; Game Watch; <URL http://game.watch.impress.co.jp/docs/review/20100906_392026.html>; published Sep. 6, 2010; 10pp.
How to play multiplayer game; Method of infrastructure communication connection; [online]; BANDAI NAMCO Games Inc.; <URL http://www.acecombat.jp/x2/multi/setting3.html>; Published Aug. 19, 2010; 4pp.
English Translation of Final Rejection for corresponding JP Patent Application No. 2014-123677, mailed Jan. 27, 2015; 3pp.
Partial English Translation of Office action mailed Feb. 25, 2014 in corresponding Japanese Application No. 2013-264634, 5pp.
Partial English Translation of Office action mailed Sep. 30, 2014 in corresponding Japanese Application No. 2014-123677, 6pp.

(Continued)

*Primary Examiner* — Jay Liddle
(74) *Attorney, Agent, or Firm* — Lewis Roca Rothgerber Christie LLP

(57) ABSTRACT

Provided is a method for controlling a computer progressing a game played at the same time by a plurality of players divided on a plurality of maps, the method including the steps of allowing each of the plurality of players to select any one of the plurality of maps, progressing the game on maps selected respectively by the plurality of players in response to instructions from the plurality of players, and reflecting, in a display of a first map selected by a first player, game progress caused by a second player having selected a second map different from the first map.

13 Claims, 11 Drawing Sheets

(56) References Cited

OTHER PUBLICATIONS

"Clash of Clans"; URL:http://en.wikipedia.org/wiki/Clash_of_Clans; Webpage Modified: Dec. 5, 2014; Game Released: Aug. 2, 2012; 6pp.

Fighting Studio; Super-Famicon Kanpeki Kouryaku series 50 Fire Emblem Monsho-no-Nazo (Mystery of the Emblem) Hissyo Kouryakuhou; Futabasha Publishers Ltd.; Jul. 5, 1997, pp. 8-9; 7pp.

Homefront; Monthly FAMITSU Connect! On; ENTERBRAIN Inc.; Apr. 27, 2011; vol. 1; No. 4; p. 100; 3pp.

QBIST Inc.; SE-MOOK Tactics Ogre Unmei-no-Wa (Wheel of Fate) Official Complete Guide; Square Enix Co., Ltd; 5th Printing; p. 017; Mar. 16, 2011; 4pp.

Suomi Matsuzaki, Hameko; Gears of War 2 Perfect Guide; ENTERBRAIN Inc.; 1st Edition; p. 6; published Oct. 28, 2009; 4pp.

Yuya Niioka et al.; Ace Combat X2 Joint Assault Perfect Guidebook; ENTERBRAIN Inc.; 1st Edition; pp. 8; 033-038; Sep. 22, 2010; 8pp.

English translation of Office action mailed Aug. 18, 2015 in corresponding Japanese Patent Application No. 2015-143962, 5pp.

"Yesterday's friend is today's enemy", Leece Brand., URL, http://leece-brand.sakura.ne.jp/leece-brand/column-room/dokken-kingdom/memorial-games/spy-vs-spy/spy-vs-spy_column.htm, 6pp.

"Spy Vs Spy, The first FC game focusing on destroying friendship", URL, http://www.geocities.jp/gurafsander/gamedera.retrogamehonbo.Spy_Vs_Spy.html, 5pp.

"Spy vs Spy Level 8 Battle with Computer", YouTube, URL, https://www.youtube.com/watch?v=nlPYGOdg94c, 2pp.

* cited by examiner

FIG. 3A

| INDIVIDUAL MAP ID | IMAGE | POSITION | LEVEL | PLAYER ID IN PLAY | CAPTURED/ UNCAPTURED | ... |
|---|---|---|---|---|---|---|
| A | Ma.jpg | (3, 1) | 1 | P01, P03, P04, P07 | UNCAPTURED | ... |
| B | Mb.jpg | (2, 2) | 3 | – | UNCAPTURED | ... |
| ... | ... | ... | ... | ... | ... | ... |
| M | Mm.jpg | (3, 5) | 5 | – | CAPTURED | ... |

FIG. 3B

INDIVIDUAL MAP A

| ENEMY CHARACTER ID | TYPE | IMAGE | LEVEL | POSITION | ... |
|---|---|---|---|---|---|
| F01 | SOLDIER A | F01.jpg | 10 | (2, 1) | ... |
| F02 | SOLDIER B | F02.jpg | 20 | (2, 4) | ... |
| F03 | WALL | F03.jpg | 5 | (6, 5) | ... |
| ... | ... | ... | ... | ... | ... |

FIG. 3C

| SOLDIER ID | IMAGE | LEVEL | ... |
|---|---|---|---|
| S01 | S01.jpg | 10 | ... |
| S02 | S02.jpg | 20 | ... |
| S03 | S03.jpg | 5 | ... |
| ... | ... | ... | ... |

FIG. 10A

| INDIVIDUAL MAP ID | IMAGE | POSITION | LEVEL | PLAYER ID IN PLAY | CAPTURED/ UNCAPTURED | ... |
|---|---|---|---|---|---|---|
| A | Ma.jpg | (3, 1) | 1 | P01, P03, P04, P07 | UNCAPTURED | ... |
| B | Mb.jpg | (2, 2) | 3 | – | UNCAPTURED | ... |
| ... | ... | ... | ... | ... | ... | ... |
| M | Mm.jpg | (3, 5) | 5 | – | CAPTURED | ... |

FIG. 10B

INDIVIDUAL MAP A

| ENEMY CHARACTER ID | TYPE | IMAGE | LEVEL | POSITION | ... |
|---|---|---|---|---|---|
| F01 | SOLDIER A | F01.jpg | 10 | (2, 1) | ... |
| F02 | SOLDIER B | F02.jpg | 20 | (2, 4) | ... |
| F03 | WALL | F03.jpg | 5 | (6, 5) | ... |
| ... | ... | ... | ... | ... | ... |

FIG. 10C

| SOLDIER ID | IMAGE | LEVEL | ... |
|---|---|---|---|
| S01 | S01.jpg | 10 | ... |
| S02 | S02.jpg | 20 | ... |
| S03 | S03.jpg | 5 | ... |
| ... | ... | ... | ... |

FIG. 10D

| PLAYER ID | NAME | IMAGE | LEVEL | SOLDIER ID | THE NUMBER OF SOLDIERS | ... |
|---|---|---|---|---|---|---|
| P01 | ○○ | P01.jpg | 10 | S01 | 10 | ... |
| | | | | S02 | 5 | ... |
| P02 | □□ | P02.jpg | 5 | S01 | 3 | ... |
| | | | | S03 | 5 | ... |
| P03 | ×× | P03.jpg | 20 | S02 | 20 | ... |
| ... | ... | ... | ... | ... | ... | ... |

FIG. 10E

| DEVICE ID | PLAYER ID | LATENCY | ... |
|---|---|---|---|
| A01 | P01 | 50ms | ... |
| A02 | P02 | 100ms | ... |
| A03 | P03 | 200ms | ... |
| ... | ... | ... | ... |

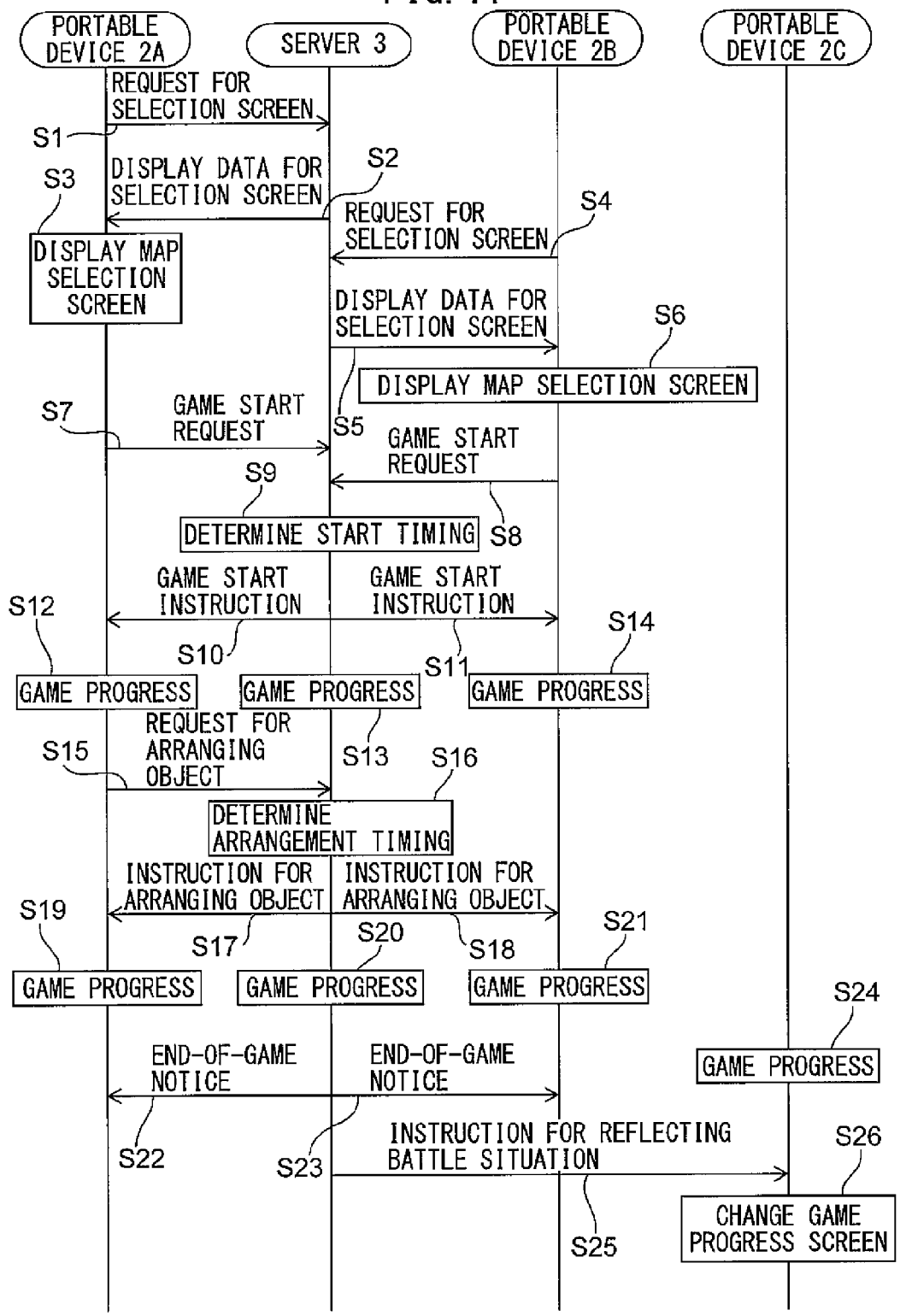

METHOD FOR CONTROLLING COMPUTER, RECORDING MEDIUM AND COMPUTER

CROSS REFERENCE TO RELATED APPLICATION

This application is a new U.S. patent application that claims benefit of JP 2013-264634, filed on Dec. 20, 2013, and JP 2014-123677, filed on Jun. 16, 2014. The entire contents of JP 2013-264634 and JP 2014-123677 are hereby incorporated by reference.

TECHNICAL FIELD

This invention relates to a method for controlling a computer, a recording medium and a computer.

BACKGROUND

In recent years, games have become commonplace which are played by installing a game program on a portable device from a server via a communication network. Such games include games in which two or more players can participate (so-called "social games"). There are games in which players cannot only battle against or help each other, but also communicate with each other.

In a portable device such as a smartphone, a communication environment and device specifications are more limited than a PC and the like, and therefore a data amount transferable among devices of two or more players and the number of objects drawable in a single device at the same time are limited. Therefore, in a game for portable devices, the number of players playable in the same game space at the same time is limited, differently from an online game referred to as MMO (Massively Multiplayer Online) where a large number of players connect to a server from devices such as PCs and the like.

As a device addressing such hardware limitations, Japanese Laid-open Patent Publication No. 2010-125222 (hereinafter, referred to as Patent Literature 1), for example, describes a game device, in which even a relatively small-scale hardware configuration such as a portable game device and the like can achieve game performance similarly to a network game. The game of Patent Literature 1 is a stand-alone type game progressing independently of other game devices, but in this game, mutual communication connection between an own game device and other game devices makes it possible to transfer game progress information. Therefore, in the game of Patent Literature 1, similarly to a network game, game progress of another game devices can be reflected in game progress of the own game device.

Further, "Clash of Clans" <URL:http://en.wikipedia.org/wiki/Clash_of_Clans> (hereinafter, referred to as Non-Patent Literature 1) describes an online game for portable devices, in which an object is arranged in a game space by an operation of a player and the object autonomously operates. In the game of Non-Patent Literature 1, players battle against each other on a one-to-one basis, differently from MMO where a large number of players can play a game on a wide range of single field map at the same time.

SUMMARY

In a game where two or more players are mutually communicable, preferably, a large number of players can play in the same game space at the same time. However, as described above, in a portable device, a communication environment and device specifications are limited, and therefore in order for a large number of players to be able to play a game at the same time, for example, as described in Non-Patent Literature 1, it is necessary to limit the number of objects arrangeable by each player. Setting such a limitation makes a game uninteresting compared with the game of Non-Patent Literature 1, even when the number of players playable in the same game space increases.

In order for a large number of players to become playable in the same game space even with limitations of device specifications and the like, it is conceivable that a game space is configured with a combination of small maps, and two or more groups each including a small number of players are allowed to play on maps different from each other. In MMO where such limitations of device specifications and the like are non-problematic, it is unnecessary to purposely disperse players onto two or more maps to capture these maps at the same time, but in a game for portable devices, it is necessary to disperse two or more players being playing at the same time onto two or more maps. However, in this case, each player captures a single limited map and therefore, it is difficult that players located on maps different from each other progress the game in cooperation with each other, and it is difficult to achieve a feeling of unity where the same game is being played.

Thereupon, an object of the invention is to provide a method for controlling a computer, a recording medium and a computer that achieve a game in which two or more players who are divided on two or more maps and play at the same time can cooperate with each other with a feeling of unity.

Provided is a method for controlling a computer progressing a game played at the same time by a plurality of players divided on a plurality of maps, the method including the steps of allowing each of the plurality of players to select any one of the plurality of maps, progressing the game on maps selected respectively by the plurality of players in response to instructions from the plurality of players, and reflecting, in a display of a first map selected by a first player, game progress caused by a second player having selected a second map different from the first map.

Preferably, in the above method, in the step of reflecting, the computer reflects, in the display, game progress on a second map adjacent to the first map selected by the first player.

Preferably, in the above method, in the step of reflecting, the computer changes an image based on whether or not the second player has captured the second map.

Preferably, in the above method, in the step of reflecting, the computer changes the display in a stepwise manner according to a degree of capture of the second map by the second player.

Preferably, in the above method, in the step of reflecting, the computer reflects the game progress on the second map in an edge of the first map selected by the first player.

Preferably, in the above method, in the step of progressing, the computer progresses the game by arranging an object on the first map selected by the first player in response to an instruction from the first player, each of the plurality of maps includes an area where the object is arrangeable and an area where the object is not arrangeable, and in the step of reflecting, the computer reflects the game progress on the second map in at least a part of the area where the object is not arrangeable on the first map selected by the first player.

Preferably, in the above method, in the step of progressing, the computer allows the first player to issues an instruction for arranging an object in a larger area on the first map, in response to reflecting, in the display of the first map selected by the first player, the game progress caused by the second player having selected the second map different from the first map.

Preferably, in the above method, in the step of allowing the players to select the maps, with respect to each of the plurality of maps, the players to select the maps, the computer sets an upper limit for the number of players able to select the map.

Preferably, in the above method, in the step of allowing the players to select the maps, the computer limits maps selectable by each of the plurality of players among the plurality of maps according to the game progress.

Preferably, the above method further includes reporting, in response to an instruction from one player, game progress in a map selected by another player to the one player.

Provided is a non-transitory computer-readable recording medium having recorded thereon a program for controlling a computer progressing a game played at the same time by a plurality of players divided on a plurality of maps, the program causing the computer to execute a process, the process including the steps of allowing each of the plurality of players to select any one of the plurality of maps, progressing the game on maps selected respectively by the plurality of players in response to instructions from the plurality of players, and reflecting, in a display of a first map selected by a first player, game progress caused by a second player having selected a second different from the first map.

Provided is a computer progressing a game played at the same time by a plurality of players divided on a plurality of maps, the computer including a selection control unit that allows each of the plurality of players to select any one of the plurality of maps, a progress control unit that progresses the game on maps selected respectively by the plurality of players in response to instructions from the plurality of players, and a progress reflection unit that reflects, in a display of a first map selected by a first player, game progress caused by a second player having selected a second map different from the first map.

The above method, recording medium and computer make it possible to achieve a game in which two or more players who are divided on two or more maps and play at the same time can cooperate with each other with a feeling of unity.

BRIEF DESCRIPTION OF THE DRAWINGS

Other features and advantages of the present invention will be apparent from the ensuing description, taken in conjunction with the accompanying drawings, in which:

FIG. 3A to FIG. 3C are views each illustrating one example of a data structure of various types of tables stored in the device storage unit 22;

FIG. 10A to FIG. 10E are views each illustrating one example of a data structure of various types of tables stored in the server storage unit 32; and FIG. 11 is a sequence view illustrating an operational example of the portable device 2 and the server 3.

DESCRIPTION

Hereinafter, with reference to the drawings, a method for controlling a computer, a recording medium, and a computer will be described. It should be noted that the technical scope of the present invention is not limited to embodiments of the invention, but covers the invention described in the claims and its equivalent.

This computer allows two or more players to select any one of two or more maps to disperse the players on the maps, and progresses a game in response to instructions from the players. The players each capture the map selected by them, and thereby cooperate with each other to capture enemy bases in the game space configured by the maps. Then, this computer reflects, in a display of each map selected by each of the players, game progress caused by another player having selected another map. For example, when a first player selects a first map and a second player selects a second map, a result that the second player has captured the second map is reflected in a display of the first map where the first player is playing. Thereby, this computer allows each player to grasp game progress in another map, and therefore, allows two or more players to play the game cooperatively with a feeling of unity.

The computer may be a server, a portable device, or a desktop device, as long as it can execute the above processing.

As one example of a game achieved by the computer, a real time strategy game in which two or more players arrange a large number of objects such as soldiers and the like on each own map and then capture an enemy territory will be described below. However, the game of the present invention is not limited by any specific game when being a game played at the same time by two or more players divided on a plurality of maps. Further, the object refers to a digital content arranged (drawn) in a game space and may be not only a soldier but also another character in the game, a facility arranged in the game space, a card, a figure, an avatar, an item, or the like.

Further, hereinafter, two or more maps configuring a game space will be referred to as "individual maps" and an entire game space configured by combining two or more individual maps will be referred to as an "entire map".

Figure 1:
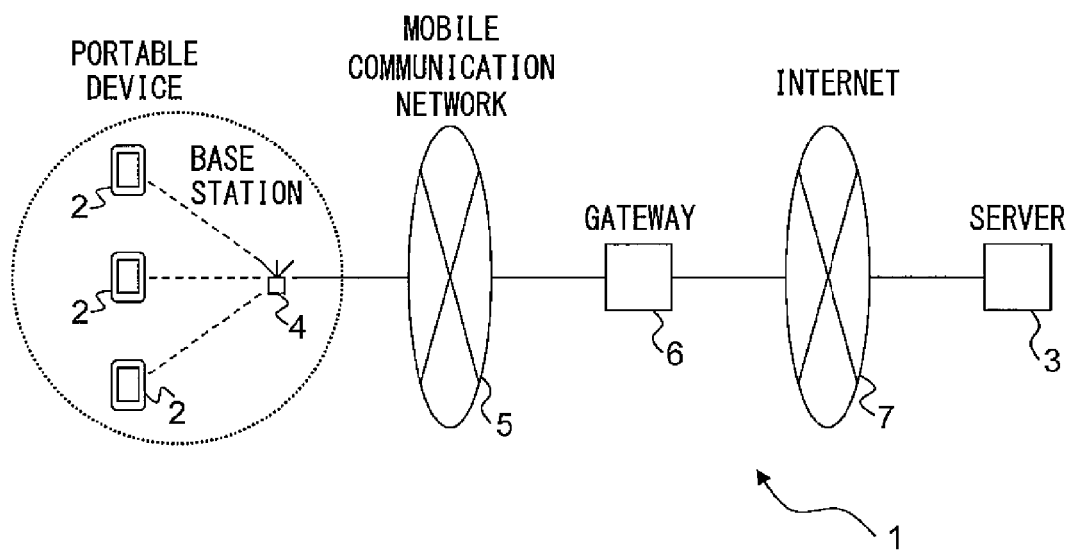
FIG. 1 illustrates one example of a schematic configuration of a game system 1.

FIG. 1 illustrates one example of a schematic configuration of a game system 1. The game system 1 includes at least one portable device 2 and a server 3.

The portable device 2 is operated by a player. The server 3 controls the progress of the game that is played by two or more players on their portable devices 2. The portable device 2 and the server 3 are connected to each other via a communication network including a base station 4, a mobile communication network 5, a gateway 6, and the Internet 7, for example. A program to be executed by the portable device 2 (e.g., a game program) and a program to be executed by the server 3 (e.g., a game control program) communicate with each other by using a communication protocol such as User Datagram Protocol (UDP), Hypertext Transfer Protocol (HTTP) and Transport Control Protocol (TCP). In particular, while the game progresses, the portable device 2 and the server 3 communicate with each other all the time via a communication network.

While a multifunctional mobile phone (a so-called "smartphone") may be assumed as the portable device 2, the present invention is not limited to this. The portable device 2 may be, for example, a mobile phone (a so-called "feature phone"), a personal digital assistant (PDA), a portable game machine, a portable music player, a tablet PC, a notebook PC, a wearable computer, or the like, as long as the present invention is applicable thereto.

Figure 2:
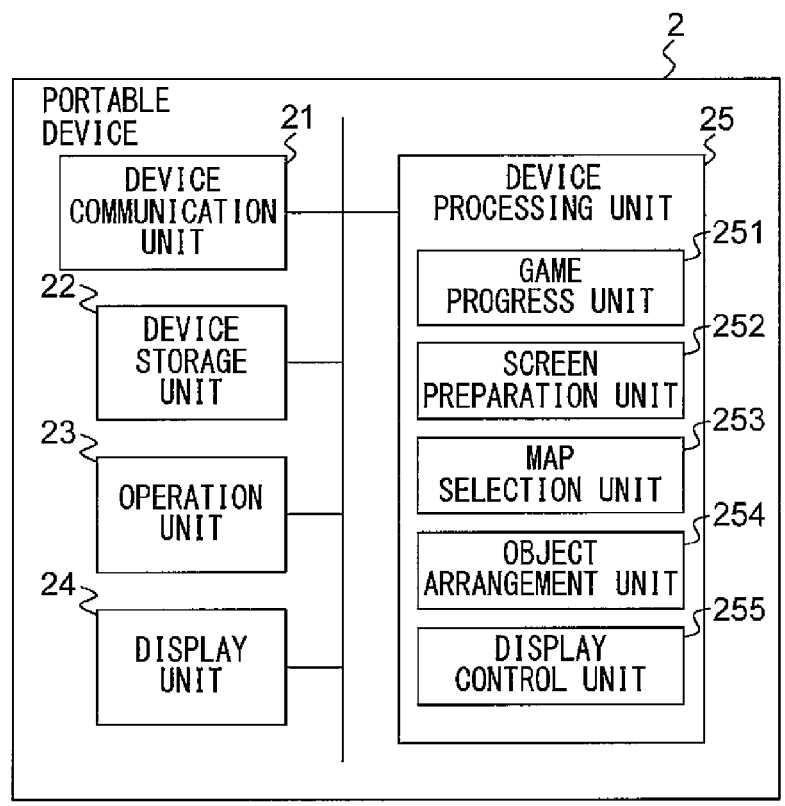
FIG. 2 illustrates one example of a schematic configuration of the portable device 2.

FIG. 2 illustrates one example of a schematic configuration of the portable device 2. The portable device 2 includes a device communication unit 21, a device storage unit 22, an operation unit 23, a display unit 24, and a device processing unit 25.

The device communication unit 21 includes a communication interface circuit including an antenna having a sensitivity band in a predetermined frequency band, and connects the portable device 2 to a wireless communication network. The device communication unit 21 establishes a communication link with the base station 4 by LTE (Long Term Evolution), Code Division Multiple Access (CDMA) or the like via a channel to be assigned by the base station 4, and communicates with the base station 4. The device communication unit 21 sends data supplied from the device processing unit 25 to the server 3 or the like. The device communication unit 21 supplies the data received from the server 3 or the like to the device processing unit 25.

The device storage unit 22 includes a semiconductor memory, for example. The device storage unit 22 stores an operating system program, a driver program, an application program, data, and the like, used for processing in the device processing unit 25. For example, as the driver program, the device storage unit 22 stores an input device driver program for controlling the operation unit 23 and an output device driver program for controlling the display unit 24. As the application program, the device storage unit 22 stores a game program and the like for progressing the game and displaying the result thereof. As the data, the device storage unit 22 stores device IDs for identifying the portable devices 2, player IDs for identifying players, an entire map table (FIG. 3A) for managing an entire map, individual map tables (FIG. 3B) for managing the individual maps configuring the entire map, a soldier table (FIG. 3C) for managing friendly soldiers and the like used by players, and image data, video data and the like relating to objects of enemy characters and friendly soldiers, and the like. Further, the device storage unit 22 may store temporary data relating to predetermined processing.

FIG. 3A to FIG. 3C are views each illustrating one example of a data structure of various types of tables stored in the device storage unit 22.

FIG. 3A illustrates one example of the entire map table. With respect to each individual map configuring the entire map, the entire map table stores an individual map ID for identifying the individual map, a file name of image data, an arrangement position on the entire map, a level indicating the difficulty degree of capture, a player ID of a player being playing thereon, whether the individual map has already been captured, and the like.

In this game, it is assumed that the entire map is configured in a grid pattern, each individual map is arranged in any one of the grids, and a location of the individual map is expressed using coordinates of a grid where, for example, the upper left of the entire map is designated as the origin. However, the entire map may be configured not only in a grid pattern but also in any form.

FIG. 3B illustrates one example of the individual map table. The individual map table is prepared for each individual map. A single individual map table stores, with respect to each enemy character arranged in the individual map, an enemy character ID for identifying the enemy character, a type, a file name of corresponding image data, a level indicating the strength of the enemy character, an arrangement position on the individual map, and the like. The enemy character may be not only an enemy soldier or the like but also a wall, a building, or the like placed in an enemy territory.

In this game, it is assumed that the individual map is also configured in a grid pattern, each enemy character is arranged in any one of the grids, and a location of the enemy character is expressed using coordinates of a grid where, for example, the upper left of the individual map is designated as the origin. However, the individual map may be configured not only in a grid pattern but also in any form.

FIG. 3C illustrates one example of the soldier table. With respect to each soldier, the soldier table stores a soldier ID for identifying the soldier, a file name of corresponding image data, a level indicating the strength of the soldier, and the like.

The operation unit 23 may be any device capable of operating the portable device 2, for example, a touch panel, a key button or the like. The player can input letters, numbers, symbols, and the like by using the operation unit 23. When operated by the player, the operation unit 23 generates a signal corresponding to the operation. The generated signal is supplied to the device processing unit 25 as a command from the player.

The display unit 24 may be any device capable of displaying a video, an image, and the like, for example, a liquid crystal display, an organic electro-luminescence (EL) display, and the like. The display unit 24 may be integrated with the operation unit 23 by using a liquid crystal touch panel display, for example. The display unit 24 displays a video, an image, and the like, corresponding to video data and image data supplied from the device processing unit 25.

The device processing unit 25 includes one or more processors and their peripheral circuits. The device processing unit 25 is, for example, a central processing unit (CPU), and integrally controls an overall operation of the portable device 2. The device processing unit 25 controls operations of the device communication unit 21, the display unit 24, and the like, so that various types of processing of the portable device 2 are executed in an appropriate order in accordance with the programs stored in the device storage unit 22, the operation of the operation unit 23, and the like. The device processing unit 25 executes processing based on the programs (the operating system program, the driver program, the application program, and the like) stored in the device storage unit 22. The device processing unit 25 can execute multiple programs (application programs, and the like) in parallel.

FIG. 4 to FIG. 8B are views each illustrating one example of an entire map, individual maps, and a display screen of the portable device 2 regarding a game provided by the game system 1. With reference to FIG. 4 to FIG. 8B, an outline of this game will be described below.

Figure 4:
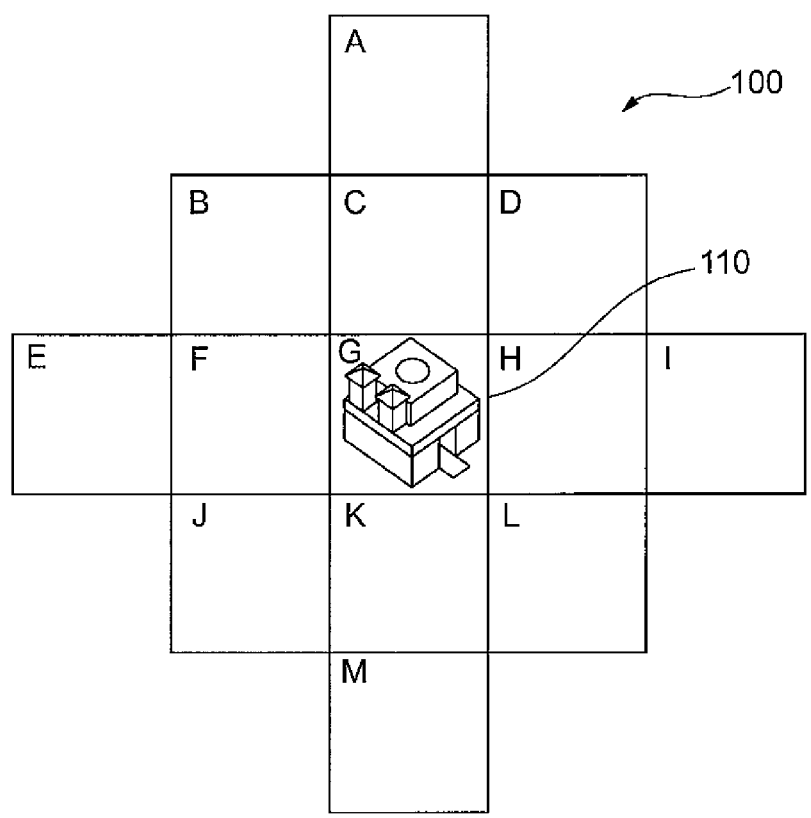
FIG. 4 is a view illustrating one example of an entire map 100.

FIG. 4 is a view illustrating one example of an entire map 100. In the example of FIG. 4, the entire map 100 includes thirteen individual maps A to M. Each of the individual maps A to M corresponds to an enemy base and in particular, the individual map G corresponds to a center base 110 of the enemy. Each player selects an individual map in order from the edge of the entire map 100 and battles against an enemy character in the individual map to capture each individual map. The final target of the players is to capture the center base 110 of the enemy.

In this game, the enemy is an NPC (Non-Player Character) and is operated by a computer (the portable device 2 and/or the server 3). When, for example, the center base 110 is captured within a time limit, the players win, and when the center base 110 is unable to be captured within the time limit, the players lose. This time limit may be a specific time range such as from what time to what time on what day and the like. It is possible that the number of individual maps configuring enemy bases is increased or decreased or the combination of individual maps is changed to change a difficulty degree of the game.

Further, in this game, each player participating in the game is allocated to any one of two or more groups. The respective groups are associated with entire maps different from each other. Then, two or more players belonging to the same group share a single entire map including two or more individual maps. It is also possible that a single group is associated with two or more entire maps and players select any one of the entire maps associated with their own group.

Alternatively, the game provided by the game system 1 may be a game where players can battle against each other. In this case, it is possible that two or more players belonging to the same group battle against each other in the entire map of the group, or two or more players belonging to one group and two or more players belonging to the other group battle in a common entire map.

In the game provided by the game system 1, each player is not allowed to select an arbitrary individual map from the beginning, and a certain limitation in selection order of individual maps is set. It is assumed that when, for example, all individual maps adjacent vertically and horizontally have not been captured, the center individual map is unselectable. Further, an individual map selectable at the game start is assumed to be only ones in contact with an outer circumference of the entire map 100. For example, in the example of FIG. 4, at the game start, of the individual maps A to M, the individual maps C, F, G, H, and K are unselectable. Then, when an outermost single individual map has been captured, an individual map of the inside adjacent to the captured individual map becomes also selectable. When, for example, a certain player has captured the individual map B, the individual maps C and F become newly selectable. To capture the center base 110, players need to capture (destroy) individual maps in order from an outermost individual map.

Figure 5:
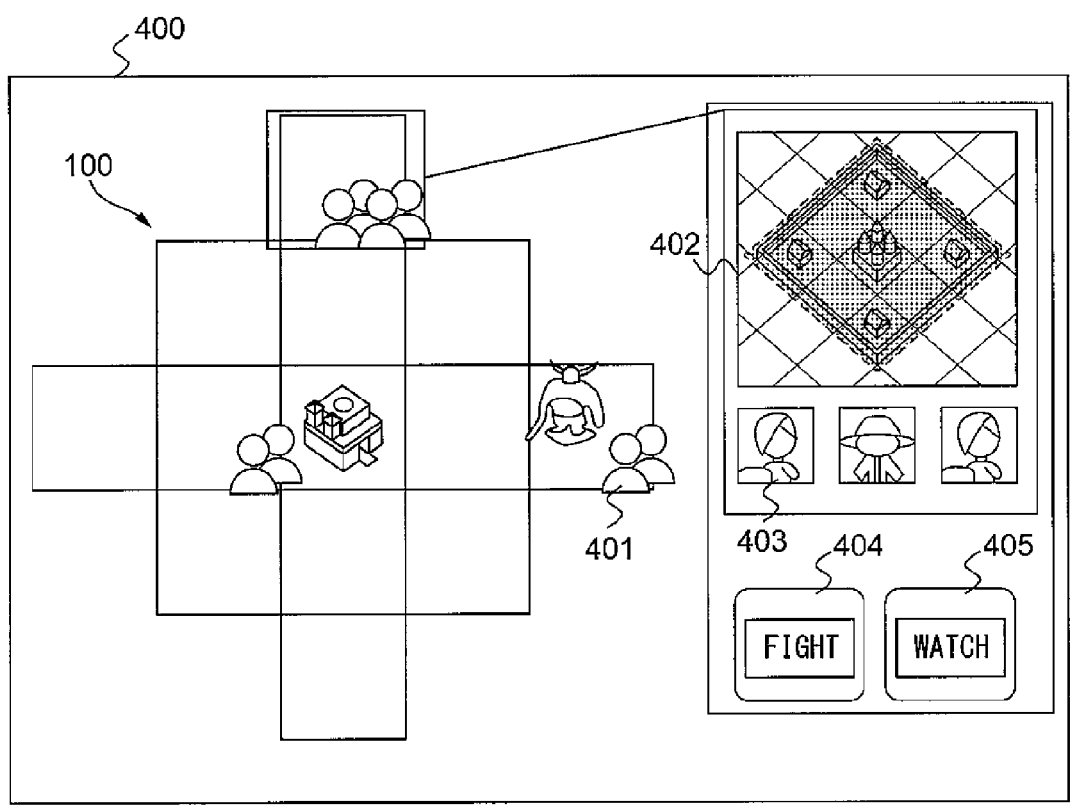
FIG. 5 is a view illustrating one example of a map selection screen 400.

FIG. 5 is a view illustrating one example of a map selection screen 400. The map selection screen 400 is displayed in the portable device 2 of each player at the game start time or when each player has captured a single individual map. Each player can select any one of the individual maps A to M on the map selection screen 400 within the above-described limitation range.

The entire map 100 is displayed on the map selection screen 400 and further, on the entire map 100, the number of players in each individual map is displayed using humanoid icons 401. Then, when, for example, a player selects (e.g., taps) any one of selectable individual maps, an image 402 of the individual map, an image 403 of a player being participating in a battle in the individual map, a "battle" button 404, and a "watch" button 405 are displayed.

In this game, two or more players can participate in a battle in a single individual map at the same time. However, for the number of players able to participate in a battle in a single individual map at the same time, an upper limit such as four and the like is set. This upper limit may be different for each individual map.

When an individual map where the number of players being participating in a battle is less than four is selected, a player having executed the selection operation can participate in a battle in the individual map by selecting the "battle" button 404 in the map selection screen 400. On the other hand, regarding an individual map where the number of participants has already reached four, the "battle" button 404 is unselectable by the player. Even when the number of players has reached four once in a given individual map, when any one of the players leaves the individual map and the number of participants results in less than four, another player can participate newly in a battle in the individual map.

Further, when a player selects the "watch" button 405, a game progress screen in the target individual map similar to one in FIG. 6A to be described later is displayed. In this game progress screen, the player having selected the "watch" button 405 can confirm details of a battle situation such as the numbers of soldiers on the player side and enemy characters present in the individual map, which one of the player and the enemy characters is dominant in the individual map, and the like. Since the "watch" button 405 is provided, a player considering in which individual map the player participates in a battle or a player having had no chance of participating in a battle in a given individual map due to a limitation on the number of players can confirm a battle situation in the target individual map. The game progress screen displayed by the "watch" button 405 is one example of a screen in which, in response to an instruction from one player, game progress in an individual map selected by another player is reported to the one player.

Figure 6A:
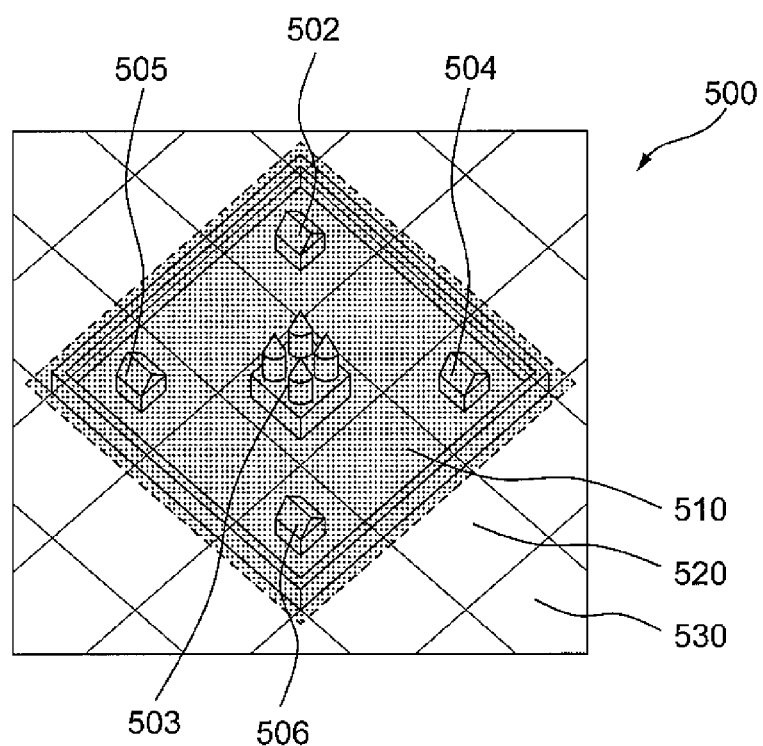
FIG. 6A is a view illustrating one example of a game progress screen 500.
Figure 6B:
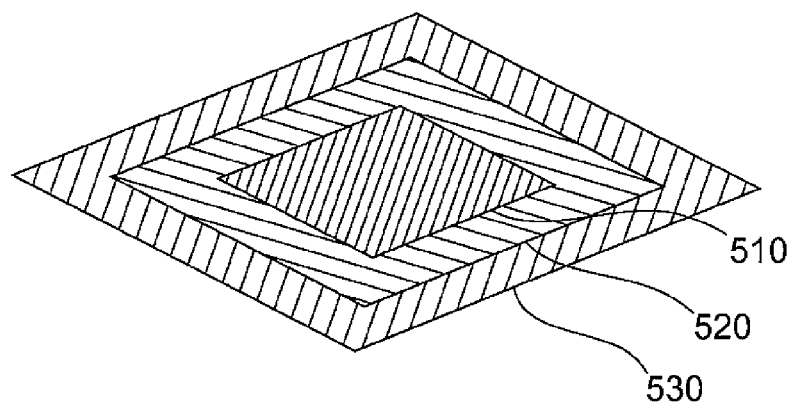
FIG. 6B is a view for illustrating a configuration of an individual map.

FIG. 6A is a view illustrating one example of a game progress screen 500. Further, FIG. 6B is a view for illustrating a configuration of an individual map. The game progress screen 500 displays an appearance where a single entire individual map is viewed obliquely. Each individual map includes a building placement area 510, a soldier arrangement area 520, and a display area 530 for a battle situation.

The building placement area 510 is an area where buildings of the enemy base are placed and enemy characters exist. On the game progress screen 500 of FIG. 6A, buildings 502 to 506 of the enemy base are arranged in the building placement area 510. Further, in the building placement area 510, enemy characters, not illustrated, are also arranged.

The soldier arrangement area 520 is an area where a soldier is arrangeable, for example, via tapping executed by a player. A soldier is not arrangeable in the building placement area 510 or the display area 530 for a battle situation, and is arrangeable only in the soldier arrangement area 520. Each player being participating in a battle arranges an object such as a friendly soldier and the like on the soldier arrangement area 520, and thereby, defeats enemy characters and destroys the buildings 502 to 506 of the enemy base. Then, when, for example, an enemy territory of at least a predetermined percentage such as 50% and the like can be destroyed within a time limit, the capture of the individual map succeeds, resulting in a win for the player. Conversely, the enemy territory of at least the predetermined percentage has been unable to be destroyed within the time limit or enemy characters have defeated all the soldiers of the player side, the capture of the individual map fails, resulting in a defeat for the player. Regarding the number of soldiers arrangeable by each player at the same time on the soldier arrangement area 520, an upper limit is set within a range of a drawing limitation according to device specifications.

The display area 530 for a battle situation is an area for displaying a battle result or a battle situation (game progress) of another player on another adjacent individual map. Each player can affect directly the progress of the game via an own operation for an individual map selected by himself/ herself, but is unable to affect directly the progress of the game via the own operation for an individual map other than the selected individual map. A display of the display area 530 for a battle situation in the portable device 2 of each player is changed according to the progress of the game in another individual map unable to be directly affected by himself/herself.

FIG. 7A to FIG. 8B are views each illustrating one example of changes of a display in the display area 530 for a battle situation.

Figure 7A:
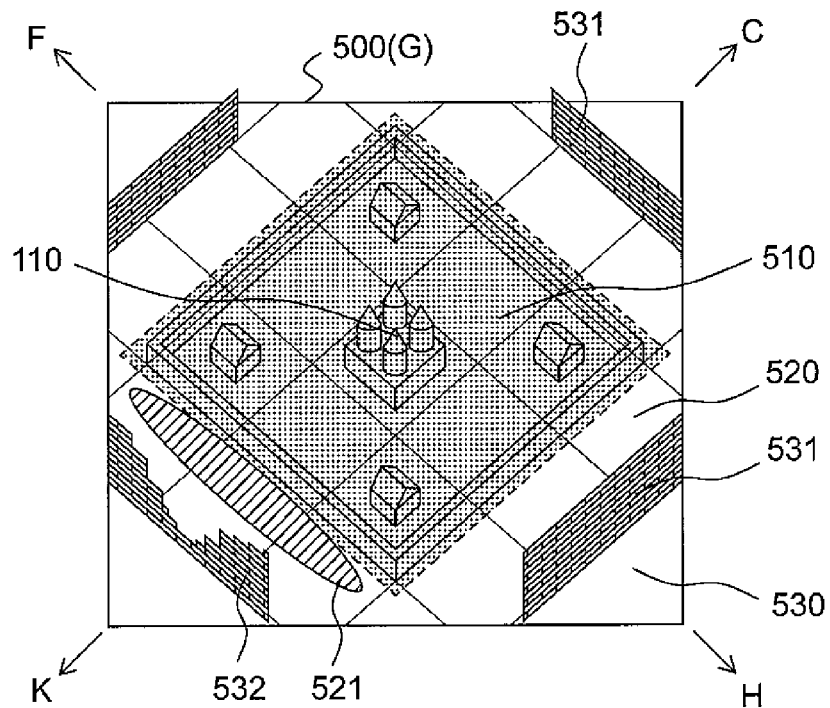
FIG. 7A to FIG. 8B are views each illustrating one example of changes of a display in the display area 530 for a battle situation.

FIG. 7A illustrates the game progress screen 500 displayed in the portable device 2 of a player present in an individual map G including the center base 110. In this example, it is assumed that individual maps C, F, and H adjacent in an upper direction and a horizontal direction have not been captured yet by any player and that only an individual map K adjacent in a lower direction has already been captured. Reflecting this situation, the game progress screen 500 of the player of the individual map G displays walls 531 in the display areas 530 for a battle situation of the upper direction and the horizontal direction, and displays a destroyed wall 532 in the display area 530 for a battle situation of the lower direction. In this case, the player of the individual map G can arrange a soldier only in an area 521 of the lower direction, which is attackable through the destroyed wall 532, in the soldier arrangement area 520, for example.

Figure 7B:
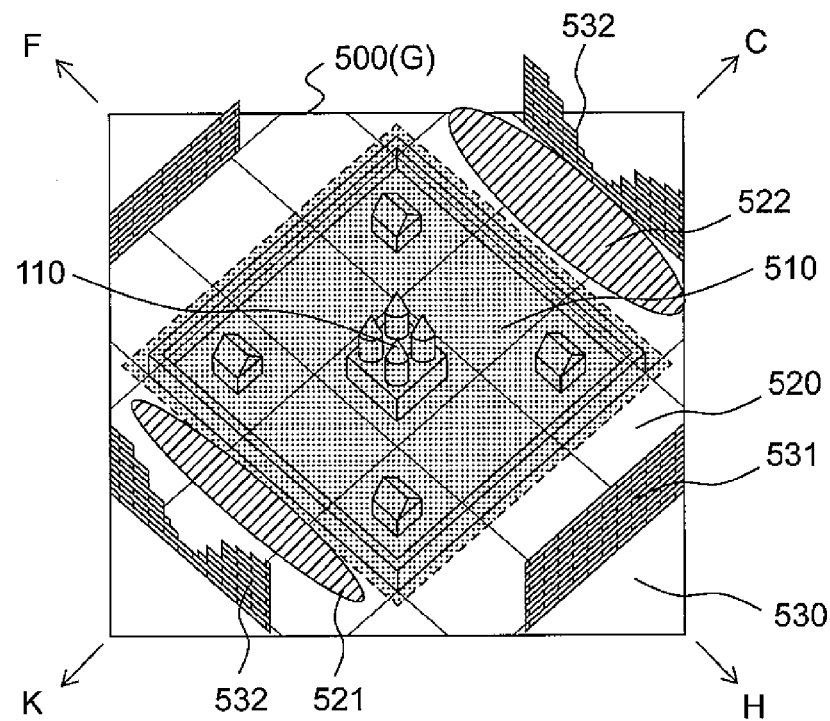

FIG. 7B illustrates the game progress screen 500 of the player present in the individual map G at the time when another player has captured the individual map C. When another player captures the individual map C while the player of the individual map G plays, reflecting this situation, in the game progress screen 500 of the player of the individual map G, the wall 531 having been located in the display area 530 for a battle situation of the upper direction is changed to the destroyed wall 532. Thereby, the player of the individual map G can newly arrange a soldier also in an area 522 of the upper direction in the soldier arrangement area 520, for example.

Figure 8A:
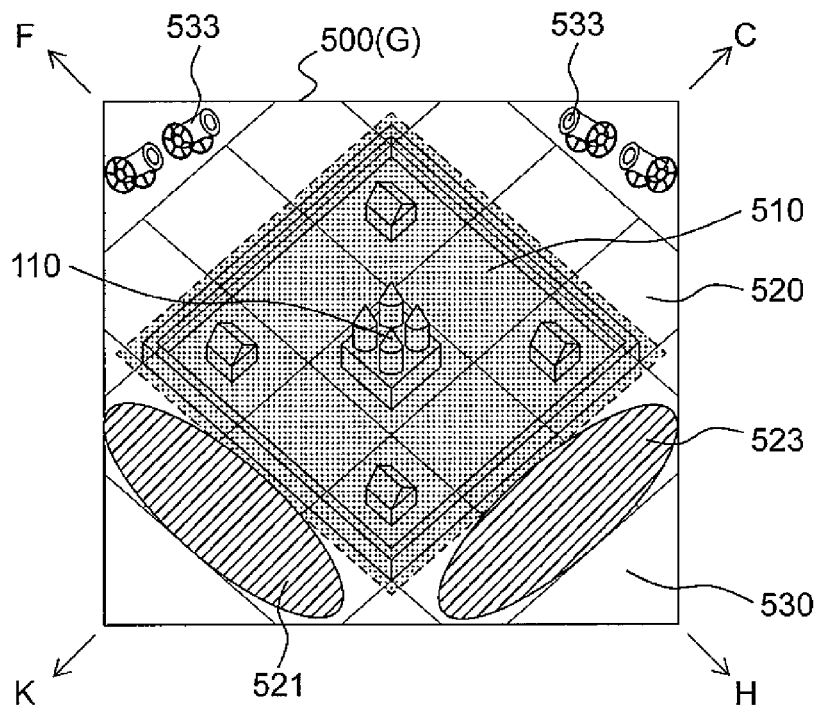

FIG. 8A illustrates another example of the game progress screen 500 displayed in the portable device 2 of a player present in the individual map G. In this example, it is assumed that the individual maps C and F adjacent in an upper direction and a left direction, respectively, have not been captured yet by any player and that the individual maps H and K adjacent in a right direction and a lower direction, respectively, have already been captured. Reflecting this situation, the game progress screen 500 of the player of the individual map G displays cannons 533 of the enemy in the display area 530 for a battle situation of the upper direction and the left direction. In this case, the player of the individual map G can arrange a soldier only in the area 521 of the lower direction and an area 523 of the right direction, which are unattackable by the cannons 533, in the soldier arrangement area 520, for example.

Figure 8B:
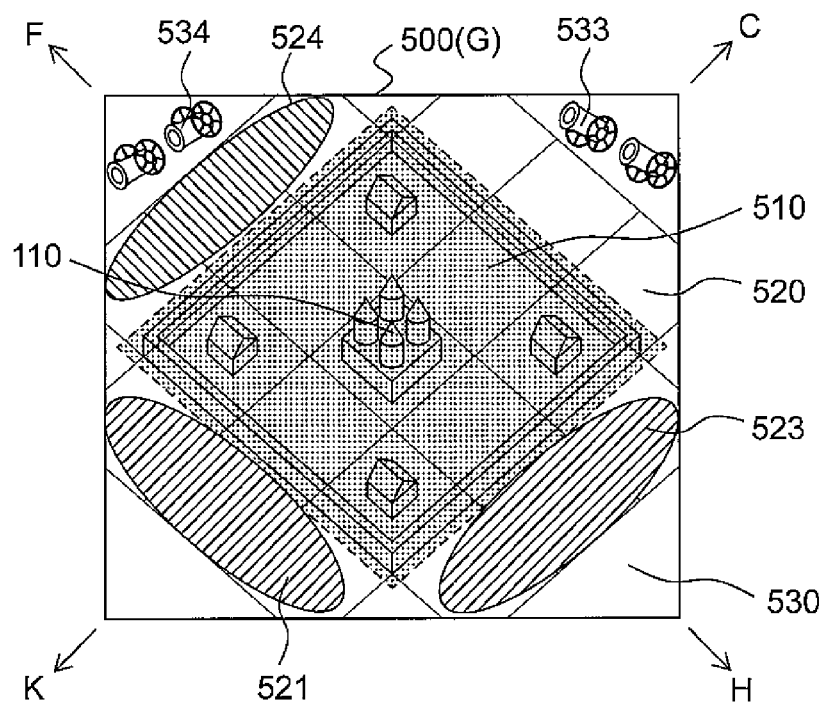

FIG. 8B illustrates the game progress screen 500 of a player present in the individual map G at the time when another player has captured the individual map F. When another player captures the individual map F while the player of the individual map G plays, reflecting this situation, in the game progress screen 500 of the player of the individual map G, the cannons 533 having been located in the display area 530 for a battle situation of the left direction are changed to destroyed cannons 534. Thereby, the player of the individual map G can newly arrange a soldier also in a soldier arrangement area 524 of the left direction in the soldier arrangement area 520, for example.

Such changes of the display in the display area 530 for a battle situation are preferably performed in real time, but a time difference to some extent is allowable. Since the display of the display area 530 for a battle situation is changed, each player can grasp, while playing the game in an individual map selected by himself/herself, a battle result or a battle situation of another player in another individual map. Then, when, for example, the individual maps C, F, H, and K adjacent vertically and horizontally are captured, the building placement area 510 including the center base 110 becomes attackable from directions of these individual maps. Therefore, the player present in the individual map G can determine more accurately where soldiers are arranged and therefore, can attack the center base 110 more advantageously through cooperation with a player of an adjacent individual map.

It is possible to reflect a battle result or a battle-situation of an adjacent individual map in the display area 530 for a battle situation not only in the individual map G of the center base 110 but also in all the individual maps A to M. Alternatively, it is possible to reflect the battle result or the battle-situation of the adjacent individual map in the display area 530 for a battle situation only in a specific individual map.

To achieve the above functions, the device processing unit 25 includes a game progress unit 251, a screen preparation unit 252, a map selection unit 253, an object arrangement unit 254, and a display control unit 255. Each of these units is a functional module achieved by a program executed by a processor included in the device processing unit 25. Alternatively, each of these units may be implemented in the portable device 2 as firmware.

The game progress unit 251 is one example of a progress control unit for starting a game on a map selected by each player and progressing the game in response to instructions of two or more players.

In response to an operation of a player, the game progress unit 251 causes the device communication unit 21 to transmit a request for a selection screen including a player ID of the player and/or a device ID of the portable device 2 to the server 3. In response thereto, when receiving display data for a selection screen from the server 3 via the device communication unit 21, the game progress unit 251 instructs the screen preparation unit 252 to prepare the map selection screen 400. The display data for a selection screen includes an individual map ID and player IDs of players being participating in a battle in the individual map. The game progress unit 251 stores these pieces of information in the entire map table.

Further, when a player issues an instruction for selecting an individual map on the map selection screen 400 via the operation unit 23, the game progress unit 251 instructs the map selection unit 253 to execute processing.

Further, when a player selects the "battle" button 404 for a certain individual map, the game progress unit 251 causes the device communication unit 21 to transmit a game start request including a player ID of the player, a device ID of the portable device 2, and the target individual map ID to the server 3. In response thereto, when receiving a game start instruction from the server 3 via the device communication unit 21, the game progress unit 251 instructs the screen preparation unit 252 to prepare the game progress screen 500.

Further, when a player selects the "watch" button 405 for a certain individual map, the game progress unit 251 causes the device communication unit 21 to transmit a request for displaying a map including a player ID of the player and/or a device ID of the portable device 2 and the target individual map ID to the server 3. In response thereto, when receiving map display data from the server 3 via the device communication unit 21, the game progress unit 251 instructs the screen preparation unit 252 to prepare the game progress screen 500. The map display data includes information regarding soldier IDs of soldiers and enemy character IDs of enemy characters and the like currently arranged in the target individual map and arrangement positions thereof.

Further, when a player being participating in a battle in an individual map issues an instruction for arranging a soldier on the game progress screen 500 via the operation unit 23, the game progress unit 251 causes the device communication unit 21 to transmit a request for arranging an object including a soldier ID of the soldier selected by the player and an arrangement position thereof to the server 3. Further, when receiving an instruction for arranging an object from the server 3 via the device communication unit 21, the game progress unit 251 instructs the object arrangement unit 254 to arrange the object.

Further, when receiving an instruction for reflecting a battle situation from the server 3 via the device communication unit 21 while the game progress screen 500 is displayed, the game progress unit 251 instructs the display control unit 255 to update the game progress screen 500. Further, when receiving an end-of-game notice from the server 3 via the device communication unit 21 while a player participates in a battle in an individual map, the game progress unit 251 ends the battle. When an instruction for reflecting a battle situation indicating that another individual map has been captured is received or the own individual map has been captured, the game progress unit 251 reflects the fact that the target individual map has been captured also in the entire map table.

Further, the game progress unit 251 periodically executes transmission and reception of Ping with the server 3, and measures a latency (communication delay) upon communication of the portable device 2 with the server 3. Then, the game progress unit 251 transmits the measurement result to the server 3.

The screen preparation unit 252 prepares display data of the map selection screen 400 and the game progress screen 500 in response to instructions issued by the game progress unit 251, and outputs the prepared display data to the display unit 24.

When the game progress unit 251 receives display data for a selection screen from the server 3, the screen preparation unit 252 extracts an individual map ID and a player ID corresponding to the individual map that are included in the display data for a selection screen. Then, the screen preparation unit 252 refers to the entire map table using the extracted individual map ID as a key, and determines a location of the target individual map on the entire map. Further, the screen preparation unit 252 acquires image data of the entire map stored in the device storage unit 22, and prepares display data of the map selection screen 400 where the icons 401 for the number of extracted players are arranged in the location of the target individual map on the entire map.

Further, when the game progress unit 251 receives a game start instruction from the server 3, the screen preparation unit 252 refers to the entire map table using an individual map ID included in the game start instruction as a key and extracts an image file name of the target individual map. Further, from the individual map table of the target individual map, the screen preparation unit 252 extracts enemy character IDs, image file names, and arrangement positions of respective enemy characters and the like arranged on the individual map. Then, the screen preparation unit 252 acquires image data of the individual map and of the enemy characters and the like corresponding to the extracted image file names from the device storage unit 22. Then, the screen preparation unit 252 arranges the image data of the enemy characters and the like on the image data of the individual map in accordance with the extracted arrangement positions, and prepares display data of the game progress screen 500.

Further, when the game progress unit 251 receives map display data from the server 3, the screen preparation unit 252 extracts soldier IDs, enemy character IDs, and arrangement positions included in the map display data. Then, from the soldier table and the individual map table of the target individual map, the screen preparation unit 252 extracts image file names of the soldiers, the enemy characters and the like arranged on the individual map. Then, the screen preparation unit 252 acquires image data of the individual map, the soldiers, and the enemy characters and the like corresponding to the extracted image file names from the device storage unit 22. Then, the screen preparation unit 252 arranges the image data of the soldiers, the enemy characters and the like on the image data of the individual map in accordance with the extracted arrangement positions to prepare display data of the game progress screen 500.

The map selection unit 253 is one example of a selection control unit that allows each player to select any one of two or more maps. When a player issues an instruction for selecting an individual map on the map selection screen 400 via the operation unit 23, the map selection unit 253 acquires the image 402 of the individual map, the image 403 of a player being participating in a battle in the individual map, and images of the "battle" button 404 and the "watch" button 405 from the device storage unit 22. Then, the map selection unit 253 prepares display data where these images are arranged on the map selection screen 400, and outputs the prepared display data to the display unit 24.

However, when the number of players being participating in a battle in the selected individual map has reached an upper limit, the map selection unit 253 causes the "battle" button 404 to be in a gray out state or the like to allow the "battle" button 404 to be unselectable by any player. On the other hand, when the number of players being participating in the battle in the selected individual map has not reached the upper limit, the map selection unit 253 receives a selection of the "battle" button 404 executed by a player.

Further, the map selection unit 253 limits individual maps selectable by each player according to game progress. When, for example, all individual maps adjacent to a selected individual map vertically and horizontally have not been captured and also the selected individual map is not in contact with an outer circumference of the entire map 100, the map selection unit 253 causes the "battle" button 404 to be in a gray out state or the like to allow the "battle" button 404 to be unselectable by any player. On the other hand, when any one or all of the individual maps adjacent to the selected individual map vertically and horizontally have been captured or the selected individual map is in contact with an outer circumference of the entire map 100, the map selection unit 253 receives a selection of the "battle" button 404 executed by a player.

Regarding the "watch" button 405, the map selection unit 253 receives a selection executed by a player for any individual map.

The object arrangement unit 254 extracts, when the game progress unit 251 receives an instruction for arranging an object including a soldier ID and an arrangement position of the soldier from the server 3, an image file name corresponding to the soldier ID from the soldier table. Then, the object arrangement unit 254 acquires image data of the soldier corresponding to the extracted image file name from the device storage unit 22, configures the game progress screen 500 where the image data of the soldier is arranged in the arrangement position on the target individual map, and outputs the configured screen to the display unit 24.

Further, when receiving, from the server 3, an instruction for eliminating an object according to the fact that, for example, any soldier or enemy character has been defeated in a battle between friendly soldiers and enemy characters, the object arrangement unit 254 eliminates the corresponding object from the game progress screen 500.

The display control unit 255 is one example of a progress reflection unit that reflects, in a display of a first individual map selected by a player, game progress caused by another player having selected a second individual map different from the first individual map. When the game progress unit 251 receives an instruction for reflecting a battle situation from the server 3 while the game progress screen 500 is displayed, the display control unit 255 reflects, in the game progress screen 500, game progress in an individual map included in the instruction. This instruction for reflecting a battle situation is transmitted from the server 3 when, for example, another player has captured a second individual map adjacent to a first individual map displayed on the game progress screen 500.

The display control unit 255 extracts an individual map ID included in the instruction for reflecting a battle situation received by the game progress unit 251, refers to the entire map table, and then determines a positional relationship between an individual map corresponding to the individual map ID and the individual map being displayed. Then, the display control unit 255 prepares display data where, of four display areas 530 for a battle situation being displayed in four corners of the game progress screen 500, a display of one closest to the individual map notified in accordance with the instruction for reflecting a battle situation is changed. For example, as illustrated in FIG. 7A to FIG. 8B, the display control unit 255 prepares display data where the wall 531 or cannon 533 having been displayed in the target display area 530 for a battle situation is changed to the destroyed wall 532 or cannon 534. Thereby, the display control unit 255 reflects the fact that another player has captured the individual map notified in accordance with the instruction for reflecting a battle situation, in a display of the game progress screen 500.

In this manner, the display control unit 255 reflects game progress on another individual map in the display area 530 for a battle situation that is an edge of an individual map. In other words, the display control unit 255 reflects game progress on a second individual map in at least a part of an area where an object such as a soldier and the like is not arrangeable on a first individual map selected by a player.

When an instruction for reflecting a battle situation is notified from the server 3 according to the fact that another player has captured another individual map, the display control unit 255 changes a display of a wall or the like of the display area 530 for a battle situation in a corresponding direction to a display of a destroyed wall or the like. Alternatively, when an instruction for reflecting a battle situation is notified in a stepwise manner from the server 3 according to a degree of capture (a battle-situation such as 20% destroyed, 50% destroyed, 80% destroyed, and the like) of another individual map by another player, the display control unit 255 may change a display of the display area 530 for a battle situation in a stepwise manner according to the degree of capture.

Figure 9:
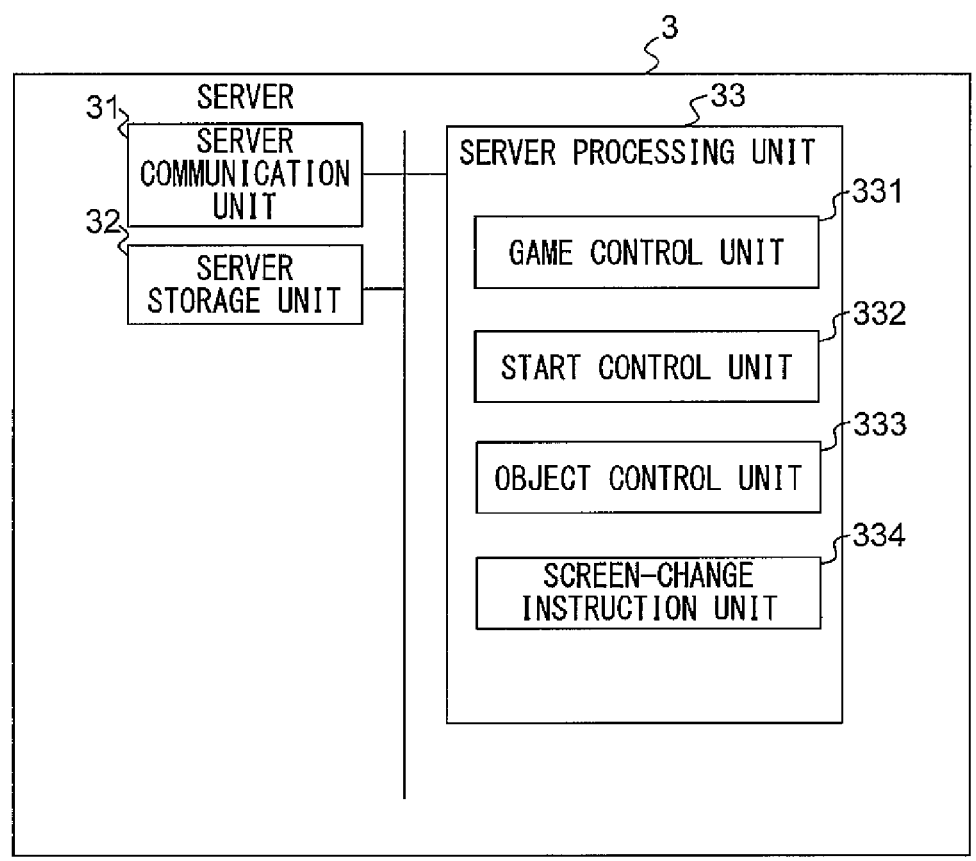
FIG. 9 illustrates one example of a schematic configuration of the server 3.

FIG. 9 illustrates one example of a schematic configuration of the server 3. The server 3 includes a server communication unit 31, a server storage unit 32, and a server processing unit 33.

The server communication unit 31 includes a communication interface circuit for connecting the server 3 to the Internet 7, and communicates with the Internet 7. The server communication unit 31 supplies data received from the portable device 2 or the like to the server processing unit 33. The server communication unit 31 sends data supplied from the server processing unit 33 to the portable device 2 or the like.

The server storage unit 32 includes at least one of a magnetic tape device, a magnetic disk device, a flash memory, and an optical disk device, for example. The server storage unit 32 stores an operating system program, a driver program, an application program, data, and the like, used for processing in the server processing unit 33. For example, as the application program, the server storage unit 32 stores a game control program and the like for controlling arrangement and operation of objects. As the data, the server storage unit 32 stores an entire map table (FIG. 10A) for managing an entire map, individual map tables (FIG. 10B) for managing individual maps configuring the entire map, a soldier table (FIG. 10C) for managing friendly soldiers and the like used by players, a player table (FIG. 10D) for managing the players, a device table (FIG. 10E) for managing the portable devices 2 used by the players, and image data, video data and the like relating to objects of enemy characters and friendly soldiers, and the like. Further, the server storage unit 32 may store temporary data relating to predetermined processing.

FIG. 10A to FIG. 10E are views each illustrating one example of a data structure of various types of tables stored in the server storage unit 32.

FIG. 10A illustrates one example of the entire map table. Similarly to the table illustrated in FIG. 3A, with respect to each individual map configuring the entire map, the entire map table stores an individual map ID, an image file name, a position, a level, a player ID of a player being playing thereon, whether the individual map has already been captured, and the like.

FIG. 10B illustrates one example of the individual map table. The individual map table is prepared for each individual map. Similarly to the table illustrated in FIG. 3B, a single individual map table stores, with respect to each enemy character arranged in the individual map, an enemy character ID, a type, an image file name, a level, a position, and the like.

FIG. 10C illustrates one example of the soldier table. Similarly to the table illustrated in FIG. 3C, with respect to each soldier, the soldier table stores a soldier ID, an image file name, a level of the soldier, and the like.

FIG. 10D illustrates one example of the player table. With respect to each player registered in the game system 1, the player table stores a player ID, a name and a level of the player, soldier IDs and the number of soldiers possessed by the player, and the like.

FIG. 10E illustrates one example of the device table. With respect to each player registered in the game system 1, the device table stores a device ID of the portable device 2 used by the player, a player ID, a latency upon communication of the portable device 2 with the server 3, and the like.

In the game system 1, the device storage unit 22 and the server storage unit 32 store the same entire map table, individual map tables, and soldier table, as illustrated in FIG. 3A to FIG. 3C and FIG. 10A to FIG. 10E. However, if the device processing unit 25 inquires the information of these tables of the server 3 as necessary, these tables may be stored only in the server storage unit 32.

The server processing unit 33 includes one or more processors and their peripheral circuits. The server processing unit 33 is, for example, a CPU, and integrally controls an overall operation of the server 3. The server processing unit 33 controls an operation of the server communication unit 31 or the like so that various types of processing of the server 3 are executed in an appropriate order in accordance with the programs stored in the server storage unit 32. The server processing unit 33 executes processing based on the programs stored in the server storage unit 32 (the operating system program, the driver program, the application program, and the like). The server processing unit 33 can execute the multiple programs (the application program, and the like) in parallel.

The server processing unit 33 includes a game control unit 331, a start control unit 332, an object control unit 333, and a screen-change instruction unit 334. Each of these units is a functional module achieved by a program to be executed by a processor included in the server processing unit 33. Alternatively, each of these units may be implemented in the server 3 as firmware.

When receiving a request for a selection screen from the portable device 2 via the server communication unit 31, the game control unit 331 refers to the entire map table stored in the server storage unit 32 and extracts, with respect to each individual map, the individual map ID and player IDs of players being participating in a battle in the individual map. Then, the game control unit 331 transmits display data for a selection screen including the extracted individual map ID and the extracted player IDs corresponding to the individual map to the portable device 2 that is the source of the request for a selection screen via the server communication unit 31.

Further, when receiving a game start request for an individual map from the portable device 2 via the server communication unit 31, the game control unit 331 instructs the start control unit 332 to execute processing.

Further, when receiving a request for displaying a map from the portable device 2 via the server communication unit 31, the game control unit 331 transmits map display data including information of soldier IDs of soldiers and enemy character IDs of enemy characters and the like currently arranged on the target individual map and information of these arrangement positions to the portable device 2 that is the source of the request for displaying a map via the server communication unit 31. The game control unit 331 stores a player ID of the player having transmitted the request for displaying a map in a column of the target individual map in the entire map table.

Further, when receiving a request for arranging an object from the portable device 2 via the server communication unit 31, the game control unit 331 instructs the object control unit 333 to execute processing.

Further, the game control unit 331 determines whether or not players being participating in a battle have destroyed an enemy territory of at least a predetermined percentage within a time limit with respect to each individual map. When the enemy territory of at least the predetermined percentage has been destroyed within the time limit, the game control unit 331 transmits an end-of-game notice indicating that the players have won to the portable devices 2 of all the players battling in the same individual map or watching the same individual map. At that time, the game control unit 331 instructs the screen-change instruction unit 334 to execute processing, and also reflects the fact that the target individual map has been captured in the entire map table. Conversely, when the enemy territory of at least the predetermined percentage has not been destroyed within the time limit or the enemy characters have defeated all the soldiers of the player side, the game control unit 331 transmits an end-of-game notice indicating that the players have lost to the portable devices 2 of the target players.

Further, the game control unit 331 periodically receives latency information from each portable device 2, and stores the information in the device table of the server storage unit 32.

The start control unit 332 executes, when the game control unit 331 receives game start requests for the same individual map from the portable devices 2 of two or more players, an adjustment so that these portable devices 2 and the server 3 start the game at substantially the same timing. At that time, the start control unit 332 refers to the device table using device IDs included in the game start requests as keys, and determines a time point after elapse of a period of time longer than latencies of the respective target portable devices 2 as a game start time. When, for example, receiving game start requests for the same individual map from the portable device 2 having a latency of 50 ms and the portable device 2 having a latency of 100 ms, the start control unit 332 determines a time after an elapse of 200 ms from the present time point as a game start time. Then, the start control unit 332 transmits a game start instruction including the target player IDs, the individual map ID, and the determined start time to the respective portable devices 2 that are the sources of the game start requests via the server communication unit 31. The start control unit 332 starts the game after the determined start time, and each portable device 2 having received the game start instruction starts the game after a time obtained by subtracting each own latency from the notified start time. Further, the start control unit 332 adds the player IDs of the players having participated in the battle for the target individual map in the entire map table.

The object control unit 333 executes, when the game control unit 331 receives a request for arranging an object from the portable device 2, an adjustment so as to arrange the object (soldier) at substantially the same time in the portable devices 2 of the respective players battling in the same individual map or watching the same individual map. At that time, the object control unit 333 refers to the entire map table, and then extracts player IDs of all the players battling in or watching the same individual map as the player having transmitted the request for arranging an object. Then, the object control unit 333 refers to the device table, and then determines a time point after elapse of a period of time longer than latencies of the respective portable devices 2 corresponding to the respective extracted players IDs as an arrangement time of the requested object. When, for example, latencies of the portable devices 2 of two players battling in the same individual map or watching the same individual map are 50 ms and 100 ms, the object control unit 333 determines a time after an elapse of 200 ms from the present time point as an arrangement time of the requested object.

Further, the object control unit 333 extracts a soldier ID and an arrangement position of the soldier included in the request for arranging an object. Then, the object control unit 333 transmits, via the server communication unit 31, an instruction for arranging an object including the target soldier ID, the arrangement position, and the determined arrangement time to the portable devices 2 of the respective players battling in or watching the same individual map as the player having transmitted the request for arranging an object. The object control unit 333 arranges the target soldier after the determined arrangement time, and the respective portable devices 2 having received the instruction arrange the target soldier after a time obtained by subtracting each own latency from the notified arrangement time.

Further, the object control unit 333 controls operations of objects currently arranged on each individual map. To this end, the object control unit 333 calculates a move destination (a new arrangement position) associated with an elapse of time at constant time intervals, with respect to all the objects currently arranged on each individual map. Then, the object control unit 333 transmits an instruction for arranging an object including a soldier ID of each soldier, an enemy character ID of each enemy character, and new arrangement positions thereof to the portable devices 2 of all the players battling in the same individual map or watching the same individual map via the server communication unit 31.

Further, the object control unit 333 determines whether or not, for example, any soldier has been defeated in a battle between friendly soldiers and enemy characters. Then, when any soldier has been defeated, an instruction for eliminating the soldier from the game progress screen 500 is included in the instruction for arranging an object.

The screen-change instruction unit 334 refers to the entire map table when a given individual map has been captured, and extracts an individual map ID of an individual map adjacent to the captured individual map and player IDs of players battling in or watching the adjacent individual map. Then, the screen-change instruction unit 334 transmits an instruction for reflecting a battle situation indicating that the adjacent individual map has been captured to the portable devices 2 of the extracted player IDs. The screen-change instruction unit 334 may transmit an instruction for reflecting a battle situation in a stepwise manner to the portable devices 2 of players battling in a first individual map adjacent to a second individual map or watching the first individual map according to not only a time when the second individual map has been captured but also a degree of capture of the second individual map.

Further, the screen-change instruction unit 334 may transmit an instruction for reflecting a battle situation to the portable devices 2 of players not only battling in another individual map adjacent to the captured individual map but also battling in or watching another individual map non-adjacent to (distant by at least two maps from) the captured individual map. Thereby, it is possible to reflect a result that, for example, a player in a non-adjacent and distant individual map has dropped a bomb or the like in a display of the display area 530 for a battle situation in the target individual map.

FIG. 11 is a sequence view illustrating an operational example of the portable device 2 and the server 3. An operation of the portable device 2 is executed mainly by the device processing unit 25 in cooperation with each element of the portable device 2, based on a program previously stored in the device storage unit 22. Further, an operation of the server 3 is executed mainly by the server processing unit 33 in cooperation with each element of the server 3, based on a program previously stored in the server storage unit 32. In FIG. 11, portable devices of two players A and B battling in the same individual map or watching the same individual map are expressed as portable devices 2A and 2B, respectively, and a portable device of a player C battling in another individual map adjacent to the individual map or watching the individual map is expressed as a portable device 2C.

Initially, the portable device 2A transmits a request for a selection screen to the server 3 in response to an operation executed by the player A (step S1). In response thereto, the server 3 transmits display data for a selection screen to the portable device 2A (step S2), and the portable device 2A displays the map selection screen 400 in the display unit 24 based on the received display data for a selection screen (step S3). Also between the portable device 2B and the server 3, a request for a selection screen and display data for a selection screen are transferred in the same manner, and the map selection screen 400 is displayed also in the display unit 24 of the portable device 2B (steps S4 to S6).

Then, when the players A and B select the same individual map on the map selection screen 400 displayed in each of the own portable devices 2A and 2B and operate the "battle" button 404, the portable devices 2A and 2B each transmit a game start request to the server 3 (steps S7 and S8). Then, in the server 3, the start control unit 332 determines a timing of starting the game based on latencies of the portable devices 2A and 2B (step S9). Then, the server 3 transmits a game start instruction including information of the start time of the game to the portable devices 2A and 2B (steps S10 and S11).

Thereby, the portable devices 2A and 2B and the server 3 progress the game regarding the target individual map in accordance with instructions from the players A and B (steps S12 to S14). When the player A issues an instruction for arranging a soldier on the game progress screen 500, the portable device 2A transmits a request for arranging an object to the server 3 (step S15). Then, in the server 3, the object control unit 333 determines a timing of arranging the object (soldier) based on the latencies of the portable devices 2A and 2B (step S16). Then, the server 3 transmits an instruction for arranging an object including information of the arrangement time of the object to the portable devices 2A and 2B (steps S17 and S18). Thereafter, the portable devices 2A and 2B and the server 3 still progress the game regarding the target individual map in accordance with instructions from the players A and B (steps S19 to S21).

Then, when the players A and B capture the target individual map, the server 3 transmits an end-of-game notice to the portable devices 2A and 2B (steps S22 and S23). On the other hand, in another individual map adjacent to the target individual map, the portable device 2C progresses the game in accordance with instructions from the player C (step S24). The server 3 transmits an instruction for reflecting a battle situation indicating that the individual map of the players A and B has been captured to the portable device 2C of the player C whose individual map adjacent to the individual map of the players A and B (step S25). Thereby, in order to reflect game progress that the individual map of the players A and B has been captured, the portable device 2C changes a display of the display area 530 for a battle situation in the game progress screen 500 (step S26). With the above, an operation for reflecting game progress caused by a player having selected a certain individual map in a display of an individual map of another player ends.

As having been described above, in the game provided by the game system 1, when, for example, a first player selects a first map and a second player selects a second map, a result that the second player has captured the second map is reflected in a display of the first map where the first player is playing. Thereby, in the game system 1, each player can grasp game progress in another map and therefore, two or more players can play the game cooperatively with a feeling of unity.

In the above description, a level indicating a difficulty degree of capture of each individual map was described as one predetermined in the entire map table, but a difficulty degree of capture of a center individual map is changeable according to the fact whether or not individual maps adjacent vertically and horizontally have been captured. As, for example, of four individual maps adjacent vertically and horizontally, the number of uncaptured maps is large, a difficulty degree of capture of the center individual map may be increased. In this case, as game progress methods, various tactical operations are conceivable including advantageously progressing a battle in the center base 110 by capturing individual maps of a circumference of the center base 110 over time and quickly capturing the center base 110 by linearly moving from the edge of the entire map. Therefore, the game can be allowed to be profound.

Further, according to a level of a player being participating in a battle in a single individual map, a difficulty degree of capture of the individual map is changeable. For example, as the level of the player is high, an area of the individual map may be further increased or an appearing enemy character may be further strengthened to increase a difficulty degree of capture of the individual map.

Further, on the map selection screen 400 or the game progress screen 500, a difficulty degree of capture of each individual map may be displayed, or the difficulty degree may not be displayed. With a display of the difficulty degree, each player can consider an order of selecting individual maps in such a manner that, for example, capturing is executed in order from a simpler one to a more difficult one. Therefore, the presence and absence of a display of a difficulty degree make it possible to provide different game performances.

Alternatively, it is possible that when capturing each individual map, a player wins an item. In this case, it is possible to change the types or number of items to be won for each individual map. Further, it is possible to clearly indicate what item can be won in which individual map to a player. This makes it possible to provide to the player a pleasure of planning tactical operations for attacking an enemy base via any route, resulting in a possibility of enhancement of game interest.

A computer program for causing a computer to execute the respective functions of the device processing unit 25 and the server processing unit 33 may be provided in a form recorded on a non-transitory computer-readable recording medium such as a semiconductor recording medium, a magnetic recording medium and an optical recording medium, and may be installed on the device storage unit 22 and the server storage unit 32 from the recording medium by using a known set-up program and the like.

The preceding description has been presented only to illustrate and describe exemplary embodiments of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A method for controlling a computer including a storage that stores a plurality of maps configuring a game space and information for identifying a plurality of players, the computer providing a game to a plurality of devices of the plurality of players respectively, the method comprising the steps of:
    (a) providing to each of the plurality of players a selection to select any one of the plurality of maps to disperse the plurality of players on the plurality of maps;
    (b) storing a correspondence between the plurality of players and selected maps in the storage;
    (c) storing positional relationship between the selected maps, in the storage;
    (d) generating display data for displaying display screens of the selected maps on said devices respectively, each of the display screens including first and second display areas respectively corresponding to first and second predetermined areas of which the corresponding map is composed;
    (e) continuously monitoring and progressing a game on the plurality of maps by arranging a plurality of objects on display screens of respective maps in response to instructions from the plurality of players on the respective maps, wherein the display screens are the same for players on the same map, and wherein an object is displayed at the same position in the first predetermined area on devices of a plurality of players on the same map in response to instructions from a player; and
    (f) generating display data for updating said first and second display areas of a first map displayed on a device of a first player as the game progresses, said first display area displaying game progress on the first map, said second display area indicating game progress on a second map selected by a second player and different from the first map on the basis of said positional relationship between the first map and the second map.

2. The method according to claim 1, wherein, in step (f), the computer generates display data for updating said second display area of the first map in accordance with game progress on a second map adjacent to the first map selected by the first player.

3. The method according to claim 2, wherein, in step (f), the computer changes an image of said second display area based on whether or not the second player has captured the second map.

4. The method according to claim 3, wherein, in step (f), the computer changes the image in a stepwise manner according to a degree of capture of the second map by the second player.

5. The method according to claim 1, wherein,
said second predetermined area is located on an edge of each of the plurality of maps, and wherein
in step (f), the computer generates display data for updating said second display area of the first map in accordance with the game progress on the second map adjacent to said edge of the first map.

6. The method according to claim 1, wherein
each of the plurality of maps includes an area where an object is arrangeable and an area where an object is not arrangeable, and wherein
said second predetermined area corresponds to the area where an object is not arrangeable.

7. The method according to claim 6, further comprising enlarging an area in which the first player can arrange an object on the first map being updated.

8. The method according to claim 1, wherein, in step (a), with respect to each of the plurality of maps, the computer sets an upper limit for the number of players able to select the map.

9. The method according to claim 1, wherein, in step (a), the computer limits maps selectable by each of the plurality of players among the plurality of maps according to the game progress.

10. The method according to claim 1 further comprising reporting, in response to an instruction from one player, game progress in a map selected by another player to the one player.

11. The method according to claim 1, wherein said second predetermined area is composed of a plurality of subareas, and wherein
in step (f), the computer generates display data for updating said second display area corresponding to a subarea which is closest to the second map among the plurality of subareas of the first map.

12. A non-transitory computer-readable recording medium having recorded thereon a program for controlling a computer including a storage that stores a plurality of maps configuring a game space and information for identifying a plurality of players, the computer providing a game to a plurality of devices of the plurality of players respectively, the program causing the computer to execute a process, the process comprising the steps of:
providing to each of the plurality of players a selection to select any one of the plurality of maps to disperse the plurality of players on the plurality of maps;
storing a correspondence between the plurality of players and selected maps in the storage;
storing positional relationship between the selected maps in the storage;
generating display data for displaying display screens of the selected maps on said devices respectively, each of the display screens including Hall first and second display areas respectively corresponding to first and second predetermined areas of which the corresponding map is composed;
continuously monitoring and progressing a game on the plurality of maps by arranging a plurality of objects on display screens of respective maps in response to instructions from the plurality of players on the respective maps, wherein the display screens are the same for players on the same map, and wherein an object is displayed at the same position in the first predetermined area on devices of a plurality of players on the same map in response to instructions from a player; and
generating display data for updating said first and second display areas of a first map displayed on a device of a first player as the game progresses, said first display area displaying game progress on the first map, said second display area indicating game progress on a second map selected by a second player and different from the first map; on the basis of said positional relationship between the first map and the second map.

13. A computer providing a game to a plurality of devices of a plurality of players respectively, the computer comprising:
a storage that stores a plurality of maps configuring a game space, positional relationship between the plurality of maps in the game space and a correspondence between the plurality of players and the plurality of maps;
a selection control unit that provides to each of the plurality of players a selection to select any one of the plurality of maps to disperse the plurality of players on the plurality of maps;
a data generation unit that generates display data for displaying display screens of the selected maps on said devices respectively, each of the display screens including first and second display areas respectively corresponding to first and second predetermined areas of which the corresponding map is composed;
a progress control unit that continuously monitors and progresses a game on the plurality of maps by arranging a plurality of objects on the display screens of respective maps in response to instructions from the plurality of players on the respective maps, wherein the display screens are the same for players on the same map, and wherein an object is displayed at the same position in the first predetermined area on devices of a plurality of players on the same map in response to instructions from a player; and
a progress reflection unit that generates display data for updating said first and second display areas of a first map displayed on a device of a first player as the game progresses, said first display area displaying game progress on the first map, said second display area indicating game progress on a second map selected by a second player and different from the first map on the basis of said positional relationship between the first map and the second map.

* * * * *

UNITED STATES PATENT AND TRADEMARK OFFICE
CERTIFICATE OF CORRECTION

PATENT NO. : 9,474,974 B2
APPLICATION NO. : 14/573735
DATED : October 25, 2016
INVENTOR(S) : Takayuki Fukuda Page 1 of 1

It is certified that error appears in the above-identified patent and that said Letters Patent is hereby corrected as shown below:

In the Claims

Column 21, Line 53, Claim 12, please delete "Hall".

Signed and Sealed this
Eighth Day of May, 2018

Andrei Iancu
*Director of the United States Patent and Trademark Office*